Sept. 3, 1946. H. F. WATERS 2,407,118
METHOD OF MAKING SHALLOW BAKING PLATES OF CELLULOSE MATERIAL
Original Filed Aug. 15, 1940

INVENTOR.
HARRY F. WATERS
BY Frederick A. Norton
ATTORNEY

Patented Sept. 3, 1946

2,407,118

UNITED STATES PATENT OFFICE 2,407,118

METHOD OF MAKING SHALLOW BAKING PLATES OF CELLULOSE MATERIAL

Harry F. Waters, New York, N. Y.

Original application August 15, 1940, Serial No. 352,679. Divided and this application April 20, 1942, Serial No. 439,638

2 Claims. (Cl. 93—49)

1

The present invention relates to a method of making shallow cooking and baking utensils and, more particularly, to a baking pan of novel and improved character.

This application is a division of my application Serial No. 352,679, filed August 15, 1940, for Baking utensil.

As those skilled in the art know, heretofore pans, dishes and similar receptacles constituted of metal were used for baking pies, cakes and similar bakery products. When manufacturing and distributing pies and other products of the described character on a commercial scale, it was customary to use the metal pans in which the pie or cake was baked for delivering the product therein. Due to the fact that these metallic pans were rather expensive, it was necessary to return the pans to the baker after the baked product was sold. Of course, this necessitated returning a large number of heavy metal trays or pans to the baker and cleaning and sterilizing the same prior to their repeated use which involved inconvenience and expense. It was already suggested to employ pans or trays constituted of pulp, cardboard, or some other fibrous cellulosic product and to transfer the pie or cake from the metal pan in which it was baked onto such receptacles. These paper or cardboard receptacles were generally cheap enough to be discarded after a single use. However, transfer of various pies, particularly those containing fruit and having a relatively soft or fragile structure, involved difficulties, and the pie or other bakery product thus transferred did not offer the same attractive appearance as those sold in the pans in which they were baked. Moreover, such transfer of the pie from one receptacle into another required a considerable amount of labor and had to be executed with great care.

Another suggestion for solving the outstanding problem involved the application of baking utensils which while sufficiently resistant to heat to permit baking of the pie or cake therein, were inexpensive enough to be used only once. Such baking pans or trays were described, for example, in U. S. Patent 206,099 to Fisher. The Fisher baking pan comprises a compound sheet obtained by facing a sheet of paper with a second sheet of thin, soft and pliable material, such as a metallic foil. This compound sheet was converted into a pan-shaped article by means of suitable dies. The dish thus made retained the fruit fluids or similar fluids constituting the product to be baked without softening under their action even when highly heated. The lining or facing of foil pre-

2 vented the materials baked therein from adhering to the inner surface so that this pan was in many respects as effective as a dish of metal. A practically identical baking utensil is disclosed by Stuart in his Patents Nos. 2,027,296 and 2,170,040 which is likewise produced from a foil-coated cellulosic material by means of pressure drawing operations. While the baking pans of the Fisher-type could effectively resist baking and cooking temperatures and were inexpensive enough, great difficulties were experienced in manufacturing them on a practical and commercial scale. The principal reason for these difficulties was that the unavoidable drawing operations employed in making the pans or dishes from flat stock would expose the material to substantial drawing and stretching stresses. This would break down the structure of the material and was particularly injurious to the extremely thin and weak metallic foil covering at least the inner surface thereof. The metallic foil would break and crack and would cause discontinuities of the protective layer between the pie and the paper pan through which the semi-liquid constituents of the pie could leak into the paper. Of course, this was detrimental to the quality of the finished product. In addition, the drawing operation employed in manufacturing these pans would cause the production of wrinkles on the inner surface of the pan. These wrinkles were not only objectionable from the point of view of appearance of the pan but also caused strong adherence of the baked product to the pan so that the pie or cake could be removed only with difficulty and would break or crumble during removal. Although various other proposals and suggestions were made to solve the outstanding problem and to provide the art with a completely satisfactory, simple, attractive and inexpensive, single-use baking pan, none, as far as I am aware, of these suggestions and proposals was completely satisfactory and successful when carried into practice on a practical and commercial scale.

I have discovered a simple and completely satisfactory solution of the outstanding problem.

It is an object of the present invention to provide a method of making a single-use baking pan which eliminates the disadvantages and imperfections of prior products.

It is another object of the present invention to provide a method of making a baking pan of novel and improved character which is constituted of a fibrous cellulosic material and which is in all respects equal or superior to conventional metal baking pans.

It is a further object of the present invention to provide a method of making a baking pan for baking pies, cakes and similar bakery products which is integrally formed of a single sheet of cellulosic material by means of folding operations.

It is also within the contemplation of the invention to provide a method of making a baking or cooking utensil formed from sheet-like cellulosic material by means of folding operations which is constituted of plane and smooth walls at least on the inner surface thereof and is free from wrinkles and other detrimental irregularities of surface.

The invention also contemplates a method of making a baking utensil constituted of cellulosic sheet material, laminated with metallic foil which is extremely simple in structure, satisfactory in operation and sufficiently low in cost to be discarded after a single use.

Other and further objects and advantages of the invention will become apparent from the following description taken in conjunction with the accompanying drawing in which.

Figure 1:
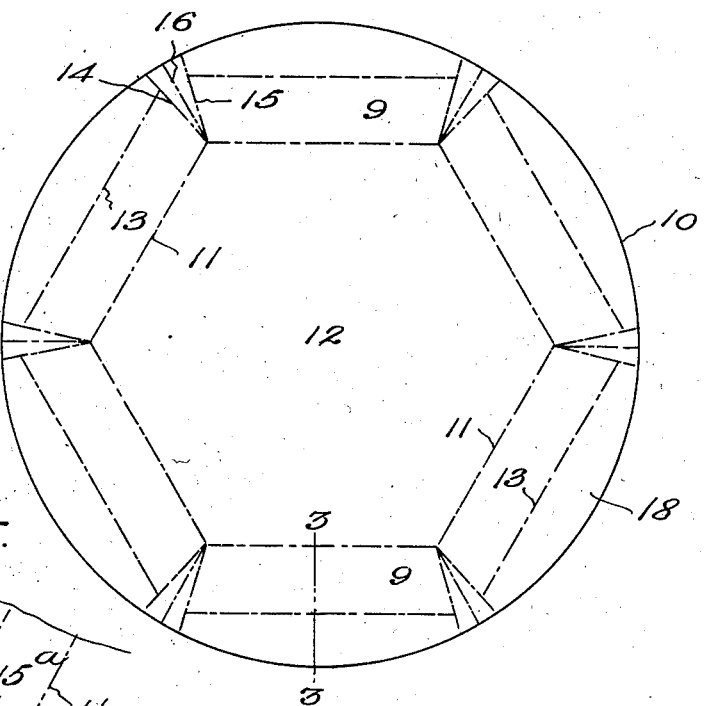
Fig. 1 illustrates a plan view of a blank for forming a preferred embodiment of the cooking utensil of the invention.

Broadly stated, according to the principles of my invention, I completely abandon and discard all prior concepts and procedures heretofore employed in the manufacture of single-use cellulosic baking pans. While all of these prior attempts for the production of baking pans from cellulosic materials involved a close imitation of the curved and circular shape of conventional metallic baking pans, I have discovered that practically all of the difficulties encountered in the manufacture of pans of the described character may be eliminated by dispensing with curved surfaces in the pan. Thus, I have found that an integral and sheet-like blank of cardboard or pasteboard may be converted into a satisfactory baking pan exclusively by means of scoring and folding operations. A regular polygonal shape has been found especially advantageous. Accordingly, a preferred embodiment of my invention comprises a bottom wall of polygonal shape, upwardly sloping side walls surrounding said bottom wall and a marginal or top flange. I have discovered that such polygon-shaped pans may be formed by means of folding operations from an integral sheet, such folding operations being greatly facilitated by the previous provision of score lines in suitable configuration. This folding operation will cause the production of excess material in the corners of the polygonal side walls and this excess material may be taken up by means of suitable pleats which at the same time provide additional reinforcement of the finished product. A suitable heat-resistant adhesive, staples, and the like fastening elements may be employed to hold said pleats together and to maintain the finished product in its desired shape.

Great variations are possible in the materials employed for making the baking pans of the invention. Generally speaking, most good quality cellulosic boards such as virgin board, ground wood board, etc., are satisfactory and capable of resisting baking temperatures. In some cases it may be advisable to add small amounts of fireproofing agents such as fire clay, certain silicates and the like for further improving the heat resistant properties of the cellulosic board. In addition, it is in most cases desirable to cover or to coat at least the inner surface of the pan with a suitable coating or laminating material in order to prevent direct contact between the article to be baked and the cellulosic body of the pan. Preferred materials for this purpose are especially aluminum foil as this is suggested in the Fisher patent, but also certain synthetic resins of a sufficiently high melting point which may be applied to such surface in the form of a layer or lamination or in the form of a coating. Those skilled in the art of resins have no difficulty in selecting such coating or laminating materials keeping in mind that such materials must have a melting point over 400° F., must not be injurious to health and must not possess any objectionable odor. Examples of such materials are vinyl resins, cellulose acetate, and the like.

A similar coating or lamination of foil, etc., may be provided on the outer surface of the pan. This may further improve the appearance of the finished product although it is generally unnecessary. Various adhesives, laminating agents and coating agents may be used as those skilled in the art will readily understand. Obviously, the adhesive and the laminating agent must be of such character as to be capable of resisting baking temperatures and at present a large number of such substances is available on the market.

Referring now more particularly to the drawing, a preferred embodiment of the invention will be described.

Fig. 1 illustrates a blank constituted of a suitable cellulosic material such as cardboard of a generally circular shape and denoted by reference character 10. Blank 10 is provided with score lines 11 defining a hexagon-shaped area 12 which subsequently is going to form the bottom wall of the finished pan. Further score lines 13 in parallel-spaced position with respect to score lines 11 are provided and define together with score lines 11 side walls 9 of the finished pan. It will be noted in Fig. 1 that score lines 13 do not meet with each other but end at score lines 14 and 15 respectively forming a generally V-shaped configuration at each corner of bottom wall 12. The angle enclosed by score lines 14 and 15 depends on the slope which is desired to be imparted to the finished pan. This angle is the greater the greater the desired slope of the finished pan. In addition to score lines 14 and 15, radially disposed score lines 16 are provided in each V-shaped pair of score lines bisecting the angle therebetween.

Figure 2:
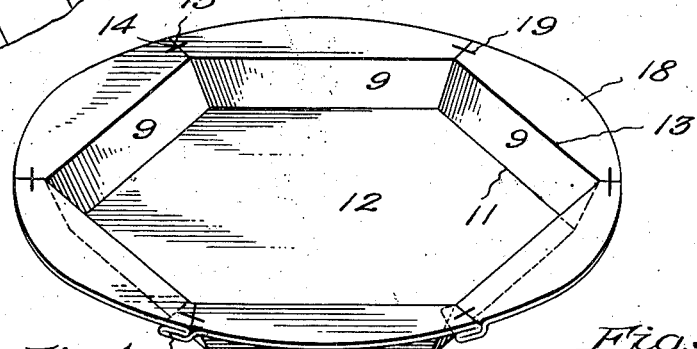
Fig. 2 depicts a perspective view of the finished cooking or baking utensil.

After the blank has been properly scored in accordance with the arrangement shown in Fig. 1, it may be readily converted into the erected form illustrated in Fig. 2. The necessary folding operations may be accomplished by means of hand manipulations although, of course, in most cases it will be preferred to employ suitable tools or folding devices for obtaining the desired result. In fact, in some cases it is possible to dispense with some or all of the score lines shown in Fig. 1 and to rely on suitable folding members or jaws to fold the material into the desired position. One practical method which was found satisfactory included pinching the material of the blank within the space defined by the divergent score lines 14 and 15 to bring lines 14 and 15 into closely adjacent position and to cause the production of a fold or pleat which takes up the excess material defined by said score lines. This pleat 17 (Figs. 2 and 4) may then be folded into the plane of flange 18 which comprises the portions of the circular blank defined by score lines 13 and the terminal portions of score lines 14 and 15. It is preferred to bend the flange portions into a position in which they are substantially parallel with bottom wall 12.

After the blank has been shaped and folded into the desired polygonal form illustrated in Fig. 2, it may be permanently retained in shape by means of suitable fastening elements 19. These fastening elements may be in the simplest case metallic staples bonding certain portions of the flanges or inserted in the pleats 17 underneath the flange. The latter procedure is generally preferred since it prevents the possibility of contact of the baked product with the staple. It is also possible, however, to use a textile thread stitched around the circumference of the flange or a suitable adhesive capable of resisting baking temperatures without deteriorating or softening.

Figure 4:
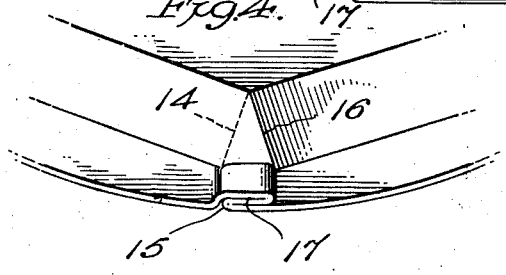
Fig. 4 shows an enlarged and fragmentary perspective view of the underside of one of the pleats incorporated into the utensil of the invention.
Figure 3:
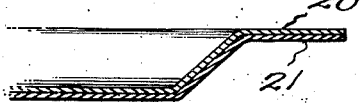
Fig. 3 is a fragmentary sectional view taken on line 3—3 of Fig. 2, the thickness of the layers therein being greatly exaggerated for clarity of illustration.

The physical appearance of pleats 17 will be best observed in Fig. 4 which is an enlarged fragmentary view illustrating the underside of the baking pan of the invention. As it has been pointed out in the foregoing, the sheet-like material of the pan is preferably laminated with a metallic foil or the like as this is clearly shown in Fig. 3. It will be observed that a metal foil, preferably aluminum, 20 is laminated or otherwise secured to cellulosic base 21. A similar lamination or its equivalent may be provided on the bottom surface of the pan.

Blank 10 has been described in the foregoing as of a generally circular shape. In case the circumference of the blank is a perfect circle, the formation of pleats 17 will slightly distort the circular shape. This may be compensated for, if desired, by providing corresponding protruding portions in the regions of the blank which are subsequently forming the pleats. In most cases, however, the distortion is slight enough to be disregarded and does not require such corrective measures.

Figure 5:
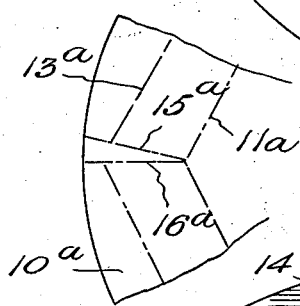
Fig. 5 is a plan view of fragmentary character of a portion of a blank forming a modified embodiment of the present invention.

Fig. 5 illustrates a portion of a modified blank 10a which is in most respects similar to the one shown in Fig. 1 and includes score lines 11—a, 13—a, 15—a and 16—a corresponding to score lines 11, 13, 15 and 16 in Fig. 1. The difference resides in the omission of score lines 14. This will cause but little change in the finished product and will merely cause that the side wall, adjoining pleat 17 from the side where score line 14 was omitted, will form a continuous and unbroken surface including the underside of the pleat (see Fig. 4). The result is a somewhat stronger and more rigid structure.

It will be noted that the baking pan of the invention provides a number of important advantages. First of all, as a result of its polygonal shape, both the bottom wall and all of the side walls of more or less sloping character are completely plane surfaces. Thus, curved surfaces are completely absent from the novel structure of the invention and a completely smooth and plane inner surface is assured which provides ideal conditions for baking and causes the production of an attractive, tasty crust.

It is also to be observed that the pan of the invention is integrally formed from a single sheet of material by means of folding operations and without expensive moulding or pressure drawing operations. As is known, folding, if properly carried out, preserves the originally smooth surface of the material and avoids the danger of the formation of detrimental wrinkles and other defects which were inseparable from prior single-use pans made by drawing processes. Thus, due to the presence of completely smooth inner surfaces the pie will not adhere to the inner surface of the pan but may be readily removed therefrom either integrally or by portions without injuring the delicate and flaky crust.

Moreover, due to the polygonal shape of the baking pan of the invention, the finished bakery product, pie or cake, may be readily cut into pieces or segments of uniform size. Furthermore, it will be noted that the pan employing the invention is extremely simple in structure and inexpensive to manufacture so that it may be discarded after a single use. Thus, for the first time in the history of the art a completely satisfactory single-use baking utensil has been provided having superior properties and permitting to bake, transport and to sell the bakery product, particularly pies, in the same receptacle.

Although the present invention has been described in connection with a preferred embodiment thereof, variations and modifications may be resorted to by those skilled in the art without departing from the principles of the present invention. Thus, while a baking pan of hexagonal shape has been illustrated, square, pentagonal, octagonal and similar regular or even irregular-shaped pans may be made. I consider all of these variations and modifications as within the true spirit and scope of my invention as disclosed in the foregoing description and defined by the appended claims.

I claim:

1. The method of making shallow plates from sheets which comprises providing an integral blank of sheet-like cellulosic blank, folding said blank along a plurality of lines to form a hexagonal flat bottom panel, upwardly sloping side walls constituted of a plurality of plane side panels, and a circular flat marginal flange having a hexagonal inner edge, and folding the excess material between said side panels into closed pleats whereby a plate having an inner surface constituted of plane surfaces is obtained.

2. The method of making shallow plates from sheets which comprises providing an integral blank of sheet-like fibrous cellulosic material having a generally circular shape, scoring said circular blank along a plurality of straight lines to define a hexagonal bottom wall panel, a plurality of side wall panels and triangular areas between adjoining side wall panels, and folding said scored blank to form a plate having a plane bottom wall surrounded by sloping plane side walls terminating at the top thereof in a continuous flat circular marginal flange having a hexagonal inner edge and having a closed pleat in each corner of said side walls constituted of said triangular areas.

HARRY F. WATERS.